(12) United States Patent
Miquet (10) Patent No.: US 11,982,384 B2
(45) Date of Patent: May 14, 2024

(54) DEVICE FOR FASTENING AN OBJECT TO A STRUCTURE

(71) Applicant: AMPHENOL-AIR LB, Carignan (FR)

(72) Inventor: Pascal Miquet, Pouru-Saint-Remy (FR)

(73) Assignee: AMPHENOL-AIR LB, Carignan (FR)

( * ) Notice: Subject to any disclaimer, the term of this patent is extended or adjusted under 35 U.S.C. 154(b) by 0 days.

(21) Appl. No.: 17/990,983

(22) Filed: Nov. 21, 2022

(65) Prior Publication Data
US 2023/0175610 A1  Jun. 8, 2023

(30) Foreign Application Priority Data

Dec. 2, 2021 (FR) ...................................... 2112875

(51) Int. Cl.
| | | |
|---|---|---|
| F16L 3/12 | (2006.01) | |
| F16M 13/02 | (2006.01) | |
| H02G 3/04 | (2006.01) | |
| B60R 16/02 | (2006.01) | |

(52) U.S. Cl.
CPC ............ *F16L 3/12* (2013.01); *F16M 13/022* (2013.01); *H02G 3/0456* (2013.01); *B60R 16/0215* (2013.01)

(58) Field of Classification Search
CPC ... F16L 3/00; F16L 3/12; F16M 13/00; F16M 13/02; F16M 13/022; H02G 3/0456; B60R 16/0215
See application file for complete search history.

(56) References Cited

U.S. PATENT DOCUMENTS

| | | | |
|---|---|---|---|
| 4,369,947 A | 1/1983 | Kuwano | |
| 5,169,100 A | 12/1992 | Milcent et al. | |
| 6,711,031 B1 * | 3/2004 | Jelinger | H02G 3/32 174/72 A |
| 6,865,087 B2 * | 3/2005 | Jelinger | H05K 7/12 361/801 |
| 7,770,852 B2 * | 8/2010 | Caveney | H02G 3/32 411/401 |
| 8,829,353 B2 * | 9/2014 | Homner | H02G 3/32 248/65 |
| 9,508,472 B2 * | 11/2016 | Deshaies | H02G 3/30 |

(Continued)

FOREIGN PATENT DOCUMENTS

| | | |
|---|---|---|
| DE | 102013222444 A1 | 5/2015 |
| EP | 0459904 A1 | 12/1991 |
| EP | 1772935 A2 | 4/2007 |

OTHER PUBLICATIONS

French Search Report and Written Opinion dated Jul. 20, 2022 in priority application No. FR2112875; with English machine translation (total 14 pages).

*Primary Examiner* — Monica E Millner (74) *Attorney, Agent, or Firm* — Seckel IP, PLLC (57) ABSTRACT

The device (1) for fastening an object (2) on a structure has a base (3) intended to be fastened on the structure, at least one support (4) which adapted for receiving said at least one object (2), for mounting the at least one support (4) on the base (3), and for fastening the at least one object (2) on the at least one support (4). The fastening device, firstly, includes at least one block (7), which equips the base (3), secondly, is adapted to secure the at least one block (7) to the base (3), and thirdly, is adapted for assembly of the at least one object (2), the at least one support (4), and the at least one block (7).

18 Claims, 5 Drawing Sheets

(56) References Cited

U.S. PATENT DOCUMENTS

| | | | |
|---|---|---|---|
| 9,528,535 B2* | 12/2016 | Massengill | B60R 16/0222 |
| 10,428,976 B2* | 10/2019 | Matz | H02G 3/32 |
| 10,896,774 B2* | 1/2021 | Stilwell | H02G 15/00 |
| 11,862,360 B2* | 1/2024 | Stilwell | H02G 3/30 |
| 2010/0127135 A1* | 5/2010 | Stocker | H02G 3/32 |
| | | | 248/70 |
| 2015/0125235 A1 | 5/2015 | Benthien et al. | |
| 2016/0245428 A1* | 8/2016 | Gustin | F16L 3/2431 |

\* cited by examiner

DEVICE FOR FASTENING AN OBJECT TO A STRUCTURE

The invention relates to a device for fastening an object to a structure.

The present invention relates to the field of manufacturing devices that are designed to fasten an object to a structure.

Without being in any way limited thereto, the present invention will find a particularly suitable application when it is a question of fastening an object comprised of a cable (more particularly an electric cable) or a bundle of cables (more particularly a bundle of electric cables) to a structure comprised of a constituent element of a vehicle, in particular a chassis or a bodywork element of such a vehicle.

Such a device for fastening an object to a structure is already known from document EP1772935. Such a fastening device comprises, firstly, a base which is intended to be fastened to said structure, secondly, a support which comprises means for receiving said object, thirdly, means for mounting the support on the base, and fourthly, means for fastening the support on the base.

The means of mounting the support on the base comprise, firstly, male interlocking means, which are comprised in the support and which are of the elastic type, and secondly, female interlocking means, with which the male interlocking means cooperate, and which are comprised in the base. The fastening means comprise, firstly, a housing which is comprised in the support, secondly, a pin which is translationally movable inside the housing, thirdly, male attachment means which are comprised in the male fitting means, and fourthly, female attachment means which are comprised in the female fitting means and which cooperate with the male attachment means. The support is mounted on the base by inserting the male interlocking means of the support inside the female interlocking means of the base. Then, the support is fastened to the base by pushing the pin inside the housing of the support by translation, which locks the male attachment means inside the female attachment means.

A first drawback of this fastening device is that it comprises parts with a complex shape, which complicates and increases the cost of manufacturing this fastening device.

Another drawback is that, once the pin is pushed into the housing, the support is definitively and irremediably immobilized in relation to the base. It is therefore no longer possible to modify the position of the support in relation to the base (in particular to adjust or correct the position of the receiving means) or to dismantle the device without destroying it.

A further drawback is that this fastening device allows only one object to be fastened to the structure.

Also known is a device for fastening an object to a structure, as disclosed in DE 10 2013 222 444. This fastening device comprises, firstly, a base intended to be fastened to said structure, secondly, at least one support which comprises receiving means which are configured to receive said at least one object, thirdly, mounting means which are configured to mount said at least one support to the base, and fourthly, fastening means which are configured to fasten said at least one object at least to said at least one support. In this fastening device, the fastening means comprise, firstly, at least one block which is fitted to the base, and secondly, securing means which are configured to secure said at least one block to the base. Furthermore, these fastening means comprise assembly means that are configured to assemble the base, said at least one support and said at least one block. It will be observed that, in this fastening device, the object receiving means are configured to surround said at least one object and adopt the shape of a one-piece ring. In case of error in fastening the object on the base or positioning error of this object in relation to its environment, it is necessary to remove at least the assembly means (or even the block), which, taking into account the configuration of these assembly means (or even of said block), is particularly long and difficult, if not impossible without degrading, or even destroying, to a large extent this fastening device.

The present invention seeks to remedy the drawbacks of the fastening devices of the state of the art.

To this end, the invention relates to a device for fastening at least one object to a structure. This fastening device comprises, firstly, a base intended to be fastened to said structure, secondly, at least one support which comprises receiving means which are configured to receive said at least one object, thirdly, mounting means which are configured to mount said at least one support to the base, and fourthly, fastening means which are configured to fasten said at least one object at least to said at least one support, these fastening means comprising, firstly, at least one block which equips the base, secondly, securing means which are configured to secure said at least one block to the base. This fastening device is characterized in that the fastening means also comprise assembly means, which are configured to assemble said at least one object, said at least one support, and said at least one block, and which comprise, firstly, at least one through-hole, which is comprised in said at least one block, secondly, at least one through-hole which is comprised in said at least one support, and thirdly, at least one assembly member, which passes through said at least one through-hole which is comprised in said at least one block as well as said at least one through-hole which is comprised in said at least one support and which surrounds said at least one object.

According to another feature, said at least one block comprises, firstly, a head which is located at least partially outside the base, secondly, a shaft which extends from the head, along an axis as well as at least partially inside the base, and thirdly, a plurality of lateral feet which extend from the shaft, more particularly divergently and/or radially in relation to said axis.

Another feature of the invention consists in that the securing means are configured to allow rotation of said at least one block in relation to the base and to at least limit the translational displacement of said at least one block in relation to the base.

Yet another feature relates to the fact that the securing means comprise, firstly, abutment means that are comprised in said at least one block, and secondly, complementary abutment means, which cooperate with the abutment means, and that are comprised in the base.

Yet another feature relates to the fact that at least a portion of the assembly means is configured to be removable as well as to be repositioned or replaced.

Said assembly member, firstly, is removable and configured to be repositioned or replaced, and secondly, comprises at least one clamp, at least one tie or at least one cotter.

A further feature relates to the fact that the device comprises temporary holding means which are configured to temporarily hold said at least one support in position on said at least one block.

The invention also relates to a device for fastening a plurality of objects to a structure. Such a fastening device has the features described above and comprises, firstly, a base intended to be fastened to said structure, secondly, a plurality of supports, each of which comprises receiving means which are configured to receive at least one of said objects, thirdly, mounting means which are configured to mount said supports on the base, and fourthly, fastening means, which are configured to fasten said objects at least on said supports and which comprise, firstly, a plurality of blocks which equip the base, secondly, securing means which are configured to secure said blocks and the base, and thirdly, assembly means which are configured to assemble said objects, said supports and said blocks.

Thus, the fastening device according to the invention comprises fastening means (of said at least one object at least on said at least one support) which comprise at least one block, means for securing said at least one block to the base, as well as means for assembling said at least one object, said at least one support, and said at least one block.

This fastening device therefore comprises a limited number of parts (or even a plurality of similar or identical parts) which advantageously makes it possible to streamline the manufacture of such a fastening device. In addition, these parts have simple shapes which advantageously makes it possible to facilitate the manufacture of these parts, to reduce the manufacturing costs of the fastening device and to make the fastening of at least one object to a structure more reliable by means of such a fastening device.

In this fastening device, the securing means are configured to allow rotation of said at least one block in relation to the base. Such fastening means then advantageously make it possible to adapt the angular position of said at least one block in relation to the base to the angular position of said at least one support (and therefore of the object to be fastened) in relation to the base.

In this fastening device, at least a part of the assembly means is configured to be removable as well as to be repositioned or replaced. This feature allows, advantageously, after having assembled at least one object, one support, and one block (and therefore said at least one object and the base) in an erroneous position of said at least one object in relation to the base (and therefore of said at least one object to be fastened in relation to the structure) to remove this removable part from the assembly means to correct this erroneous positioning and, after correcting the positioning, to put back in place or replace such a part of the assembly means and therefore to assemble said at least one object, said support, and said block (and therefore said at least one object and the base) in an appropriate position of said at least one object in relation to the base (and therefore in relation to the structure).

The invention also relates to a device for fastening a plurality of objects to a structure. Such a fastening device makes it possible, advantageously and via a single fastening device, to fasten a plurality of objects to a structure.

Further objects and advantages of the present invention will become apparent throughout the following description relating to embodiments which are provided only as indicative and non-limiting examples.

The understanding of this description will be facilitated by reference to the attached drawings in which.

With particular reference to the aforementioned figures, the present invention relates to the field of manufacturing devices which are designed to provide for the attachment of at least one object to a structure.

This invention will find a particularly appropriate (but in no way limited) application when it is a question of ensuring the fastening of an object constituted by a cable (more particularly an electric cable) or a bundle of cables (more particularly a bundle of electric cables) on a structure constituted by a constituent element of a vehicle, in particular a chassis or a bodywork element of such a vehicle.

The invention therefore relates to a fastening device 1 for fastening at least one object 2 to a structure (not shown).

As mentioned above and as seen in the attached figures, such an object 2 may take the form of a cable (more particularly an electric cable) or a bundle of cables (more particularly a bundle of electric cables).

This fastening device 1 comprises, therefore, a base 3 which is intended to be fastened to a structure (not shown). To this end, said base 3 may comprise a foot 30, which is intended to be secured to the structure, and which comprises at least one receiving means 31 (in particular in the form of a through-hole), which is configured to receive at least one fastening member (not shown, in particular in the form of a screw, a rivet, or the like). Said base 3 also comprises at least one hole 32, which extends along an axis, and which may be an emerging hole 32 or (and preferably) a through-hole.

Such a fastening device 1 also comprises at least one support 4 which comprises receiving means 40 which are configured to receive said at least one object 2. Such receiving means 40 may comprise a cradle which may be defined by at least one pair of arms (or even, and preferably, by two pairs of arms) which adopt a "V" configuration.

The fastening device 1 further comprises mounting means 5 which are configured to mount said at least one support 4 on the base 3. Such mounting means 5 may comprise, firstly, male interlocking means 50 that are comprised in the base 3, and secondly, female interlocking means 51, which are configured to cooperate with the male interlocking means 50, and which are comprised in said at least one support 4.

As seen in the attached figures, said male interlocking means 50 may take the form of at least one outer ring, which is comprised in the base 3, and which extends along an axis at least parallel to (or even, and preferably, coincident with) the axis along which said at least one hole 32, which is comprised in this base 3, extends. The female interlocking means 51 may adopt the form of at least one sleeve, which extends along an axis (at least parallel to—or even coincident with—the axis along which said at least one outer ring extends and/or the axis along which said at least one hole 32 of the base 3 extends), and which is engaged over such an outer ring which is then fitted inside such a sleeve.

The fastening device 1 also comprises fastening means 6 which are configured to fasten said at least one object 2 at least to said at least one support 4.

According to the invention, these fastening means 6 comprise, firstly, at least one block 7 which equips the base 3.

In fact, such a block 7 comprises, firstly, at least one internal portion which extends inside the base 3 (more particularly inside said at least one hole 32 that is comprised in this base 3), and secondly, at least one outer portion which extends outside of the base 3 (more particularly outside of said at least one hole 32 that is comprised in this base 3).

As may be seen from the attached figures, said at least one block 7 comprises, firstly, a head 70 which is located at least partly (or even entirely) outside of the base 3 (more particularly on the outside of said at least one hole 32 of the base 3), and secondly, a shaft 71 which extends from the head 70, along an axis (in particular coincident with the axis along which said at least one hole 32 of the base 3 extends) as well as at least partly (or even entirely) inside the base 3 (more particularly inside the said at least one hole 32 of this base 3), and thirdly, a plurality of lateral feet 72 which extend laterally from the shaft 71, more particularly divergently and/or radially in relation to said axis (along which the shaft 71 extends), notably inside the base 3 (more particularly comprised in said at least one hole 32 of this base 3).

The shaft 71 of said at least one block 7 is therefore interposed between the head 70 and the lateral feet 72 of such a block 7.

This shaft 71 has an outer diameter which is smaller than the outer diameter of the head 70 of said at least one block 7 as well as the outer diameter of the lateral feet 72. The outer diameter of this shaft 71 is smaller than the inner diameter of said at least one hole 32 of the base 3, which itself may be smaller than the outer diameter of the head 70 and the outer diameter of the lateral feet 72 of said at least one block 7.

These lateral feet 72 may be of the rigid, deformable, and/or elastic type, depending on the embodiment envisaged.

Moreover, the fastening means 6 comprise securing means 8 which are configured to secure said at least one block 7 and the base 3.

These securing means 8 are configured to allow rotation of said at least one block 7 in relation to the base 3, more particularly a rotation about the axis along which the shaft 71 of such a block 7 extends and/or about the axis along which said at least one hole 32 of the base 3 extends.

These securing means 8 are also configured to at least limit (or even prevent) the translational displacement of said at least one block 7 in relation to the base 3, more particularly in a direction at least parallel to the axis along which the shaft 71 of such a block 7 extends and/or to the axis along which said at least one hole 32 of the base 3 extends.

The fastening means 8 comprise, therefore, firstly, abutment means 80 which are comprised in said at least one block 7, and secondly, complementary abutment means 81, which cooperate with the abutment means 80 and which are comprised in the base 3.

It will be observed that these complementary abutment means 81 cooperate with these abutment means 80 in the context of a translational displacement of said at least one block 7 in relation to the base 3 in a direction at least parallel to the axis along which the shaft 71 of such a block 7 extends and/or to the axis along which said at least one hole 32 of the base 3 extends.

In this regard, it will be observed that the head 70 of said at least one block 7 and/or the lateral feet 72 of said at least one block 7 comprise such abutment means 80 or constitute such abutment means 80.

As mentioned above, the base 3 comprises at least one hole 32 (at least emerging, or even through) inside of which (or even through which) a part of said at least one block 7 extends, more particularly at least the shaft 71, or even the lateral feet 72 of such a block 7.

According to a first embodiment illustrated in the attached figures, said at least one hole 32 comprises, internally, at least one internal radial element 33 which comprises the complementary abutment means 81 or which the complementary abutment means 81 comprise. Such an internal radial element 33 extends from the internal wall of said at least one hole 32 and in the direction of the axis along which such a hole 32 extends, more particularly radially in relation to this axis.

Preferably, said at least one hole 32 comprises a plurality of internal radial elements 33 which extend from the internal wall of such a hole 32 and converge in the direction of the axis along which such a hole 32 extends, more particularly radially.

Such an internal radial element 33 may take the form of a fin which extends in a direction at least parallel to the axis along which said at least one hole 32 extends.

Yet another feature relates to the fact that the internal radial elements 33 and/or the lateral feet 72 of said at least one block 7 are arranged, two by two, in an equiangular manner.

Another feature relates to the fact that the internal radial elements 33 and/or the lateral feet 72 of said at least one block 7 are configured (in particular sized and/or spaced apart) in such a way that these lateral feet 72 may each engage between two of these internal radial elements 33 during the positioning of said at least one block 7 on the base 3.

According to a particular embodiment, firstly, the internal radial elements 33 have an identical width and/or thickness, and secondly, at least a part of the lateral feet 72 has an identical width and/or thickness between them and at most equal to the spacing between the internal radial elements 33, while at least one lateral foot 72 has a width and/or a thickness greater than such spacing.

Additionally, the lateral feet 72 may then be rigid while at least a part of the internal radial elements 33 is deformable and/or elastic, in particular to allow the passage of said at least one lateral foot 72, which has a width and/or a thickness greater than the spacing between these internal radial elements 33, during the positioning of at least said block 7 on the base 3.

These features make it possible to maintain said at least one block 7 in position on the base 3 and to prevent such a block 7 from escaping from the base 3 and being lost.

According to a preferred embodiment, said at least one hole 32 comprises at least eight internal radial elements 33 while said at least one block 7 comprises at least eight lateral feet 72.

According to a second embodiment, not shown, said at least one hole 32 comprises, internally, at least one internal annular element which comprises the complementary abutment means 81 or which the complementary abutment means 81 comprise. Such an internal annular element may be composed either of a groove or a flange which is comprised in the internal wall of said at least one hole 32, or by a rib which projects in relation to the internal wall of said at least one hole 32.

Said at least one internal radial element 33 (preferably the plurality of internal radial elements 33) or said at least one internal annular element (more particularly the flange or the rib) delimits a housing 34, which is then comprised in said at least one hole 32, which extends along an axis at least parallel to (or coincident with) the axis along which such a hole 32 extends, and which receives at least a part of said at least one block 7, more particularly at least the shaft 71, or even the lateral feet 72 of such a block 7.

According to a third embodiment, not shown, said at least one hole 32 is bordered by at least one flange (in particular an annular flange), which comprises the complementary abutment means 81 or which the complementary abutment means 81 comprise.

In the second and in the third embodiment, the lateral feet 72 are preferably of the elastic type.

The securing means 8 and/or the base 3 (more particularly said at least one hole 32 and/or said at least internal radial element 33 or said at least one internal annular element or the flange of the hole 32) and/or said at least one block 7 (more particularly the head 70 and/or the lateral feet 72 of such a block 7) is configured so that, during the implementation of the fastening device 1, part of such a block 7 (more particularly the shaft 71 and the lateral feet 72) may be engaged (in particular by force) inside (or even through) the base 3 (more particularly inside, or even through, said at least one hole 32 of the base 3) and, after having been engaged inside (or even through) this base 3, to be secured to this base 3 while allowing rotation of said at least one block 7 in relation to the base 3.

Furthermore, the fastening means 6 comprise assembly means 9 which are configured to assemble said at least one object 2, said at least one support 4, and said at least one block 7.

At least a part of these assembly means 9 is configured to be removable as well as to be repositioned or replaced. Such a feature advantageously makes it possible to disassemble said at least one object 2, said at least one support 4 and said at least one block 7 (therefore also said at least one object 2 and the base 3), in particular to rectify the angular position of said at least one support 4 in relation to the base 3 before assembling again said at least one object 2, said at least one support 4, and said at least one block 7 (and thus, also, said at least one object 2 and the base 3).

In fact, these assembly means 9 comprise, firstly, at least one through-hole 90 in said at least one block 7 (more particularly, in the outer part or the head 70 of such a block 7), secondly, at least one through-hole 91 comprised in said at least one support 4, and thirdly, at least one assembly member 92, which passes through said at least one through-hole 90 comprised in said at least one block 7 and said at least one through-hole 91 comprised in said at least one support 4, and which surrounds said at least one object 2, notably which encircles said at least one object 2.

Such an assembly member 92, firstly, is removable and configured to be repositioned or replaced, and secondly, comprises (or, and preferably, is composed of) at least one clamp, at least one tie (in particular in the form of a fastener, a band, a cord, a string, a strap or the like) or at least one cotter.

Yet another feature relates to the fact that the fastening device 1 comprises temporary holding means 10 which are configured to temporarily hold said at least one support 4 in position on said at least one block 7, therefore on the base 3.

Figure 3:
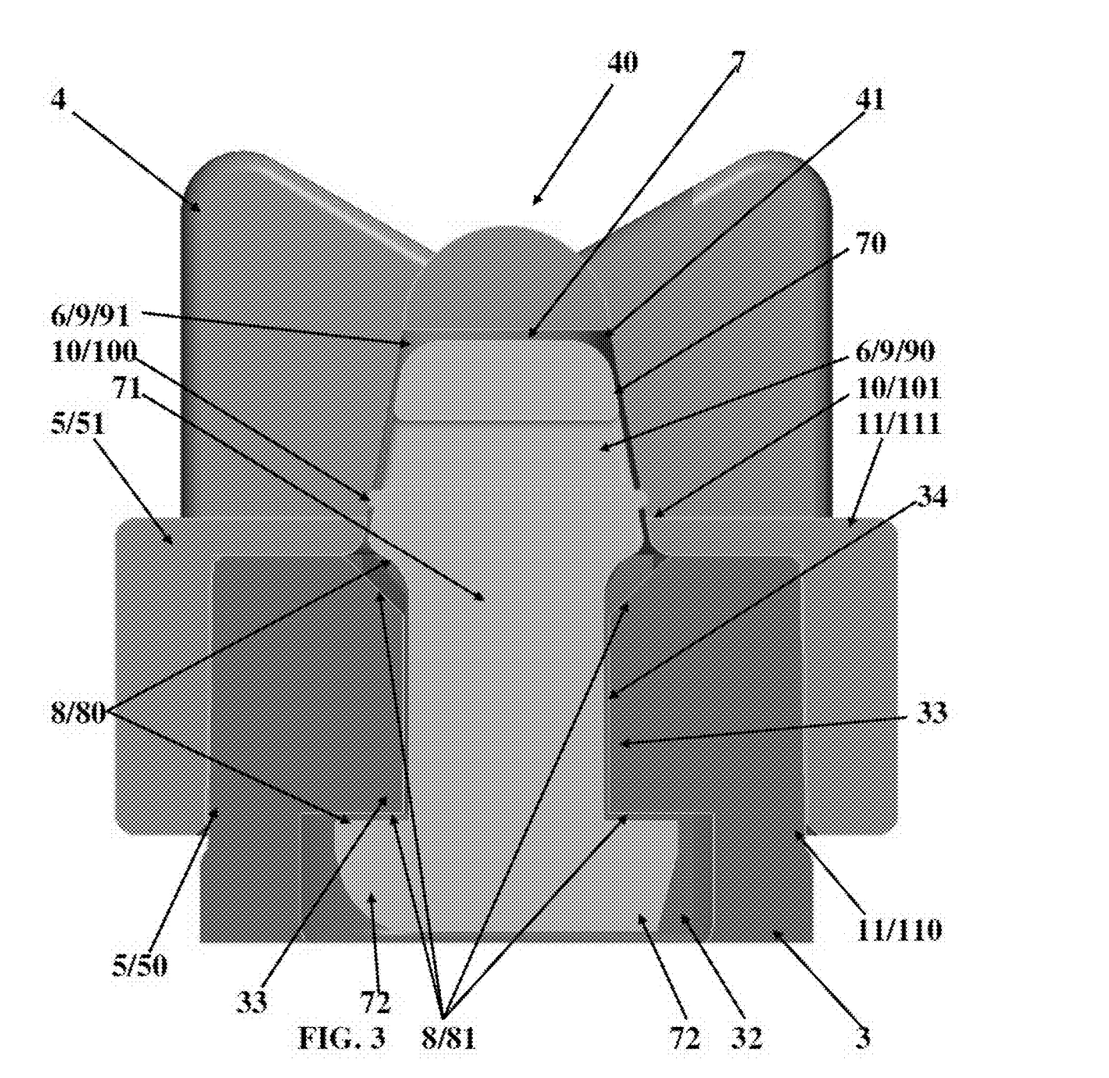
FIG. 3 is a schematic sectional view of a detail of the fastening device shown in FIGS. 1 and 2.

As seen in FIG. 3, these temporary holding means 10 may comprise, firstly, at least one abutment means 100 (more particularly in the form of at least one element in relief 100, in particular a knurl) which is comprised in said at least one block 7 (more particularly the head 70 of such a block 7), and secondly, at least one complementary abutment means 101 (in particular a flange) that is comprised in said at least one support 4, and which cooperates with said at least one abutment means 100 of said at least one block 7.

These temporary holding means 10 make it possible to hold said at least one support 4 within the fastening device 1 in particular for storage, transport, and the at least temporary positioning of this fastening device 1 on the structure.

These temporary holding means 10 are also configured to allow the withdrawal of said at least one support 4 relative to said at least one block 7 (therefore relative to the base 3) with a view to adjusting the final angular position of such a block 7 and such a support 4 in relation to the base 3. Finally, and after having adjusted this final angular position, these temporary holding means 10 make it possible, after the repositioning of said at least one support 4, to maintain said at least one support 4 within the fastening device 1 in the final angular position of said at least one block 7 and said at least one support 4 and, pending the assembly of said at least one object 2, said at least one block 7 and said at least one support 4 by the assembly means 9.

Another feature of the fastening device 1 relates to the fact that it further comprises angular positioning means 11 which are configured to angularly position said at least one support 4 in relation to the base 3 in a plurality of angular positions that may be selected. In this regard, it will be observed that the passage from one angular position to another takes place by rotation of said at least one support 4 about an axis which is at least parallel to (or even, and preferably, coincident with) the axis along which the shaft 71 of said at least one block 7 extends and/or at least parallel to (or even, and preferably, coincident with) the axis along which said at least one hole 32 of the base 3 extends.

Such angular positioning means 11 comprise, firstly, a toothed ring 110 that is comprised in the base 3 (more particularly that is comprised in the male interlocking means 50, notably the aforementioned outer ring), and secondly, a toothed sleeve 111 that is comprised in said at least one support 4 (more particularly that is comprised in the female interlocking means 51).

As mentioned above, the fastening device 1 comprises at least one support 4 which comprises the receiving means 40 which are configured to receive said at least one object 2.

Said at least one support 4 also comprises, firstly, a part of the mounting means 5 (more particularly the female interlocking means 51, in particular the aforementioned sleeve), and secondly, part of the fastening means 6 (more particularly a part of the assembly means 9, in particular said at least one through-hole 91), or even (and preferably) a part of the angular positioning means 11 (more particularly the toothed sleeve 111).

Said at least one support 4 comprises a housing 41 inside of which the head 70 of said at least one block 7 is positioned and which preferably has a shape similar (or even identical) to that of this head 70, which is preferably trapezoidal.

As mentioned above, the fastening device 1 comprises a base 3.

Figure 1:
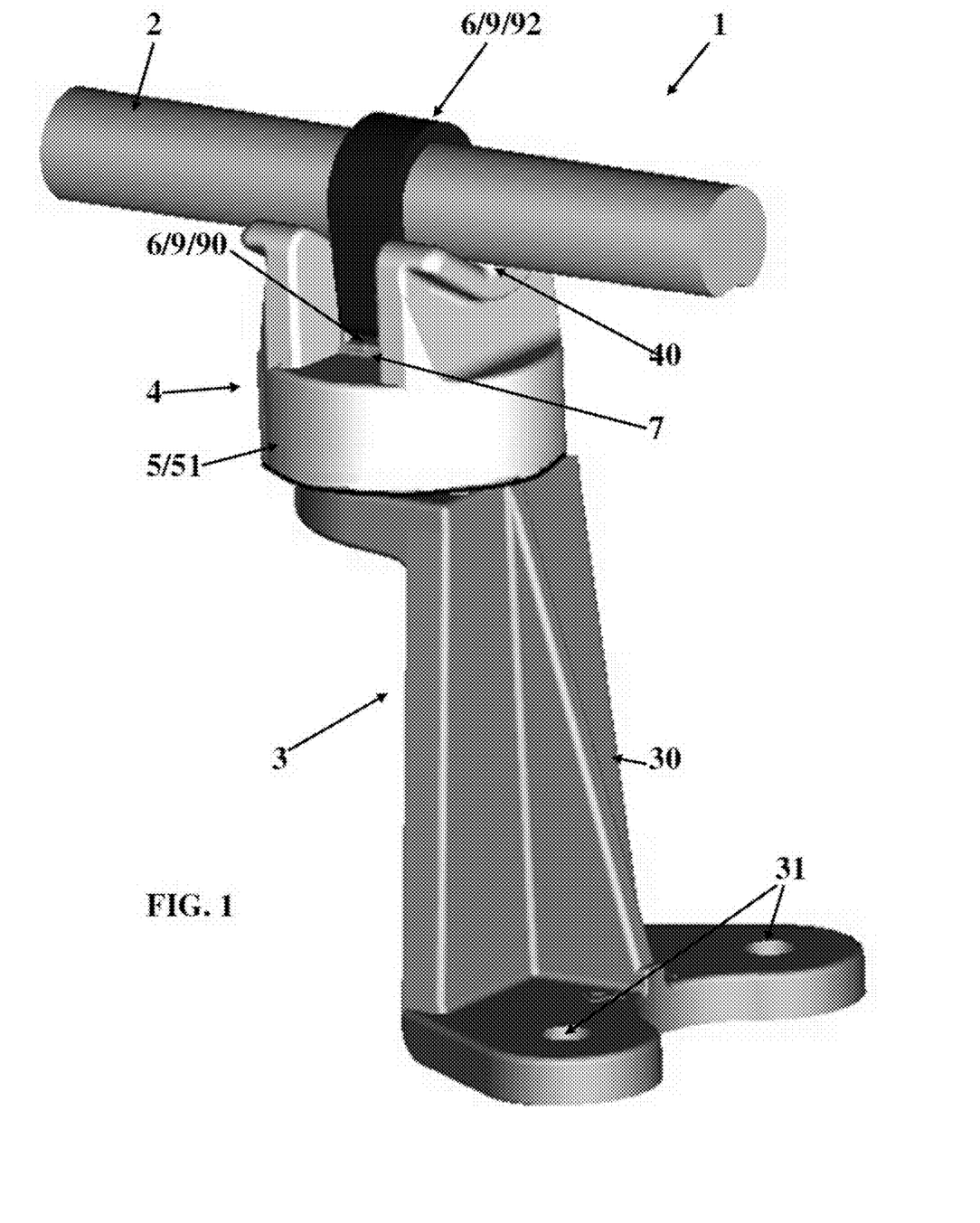
FIG. 1 is a schematic perspective view of a first embodiment of a fastening device according to the invention.
Figure 2:
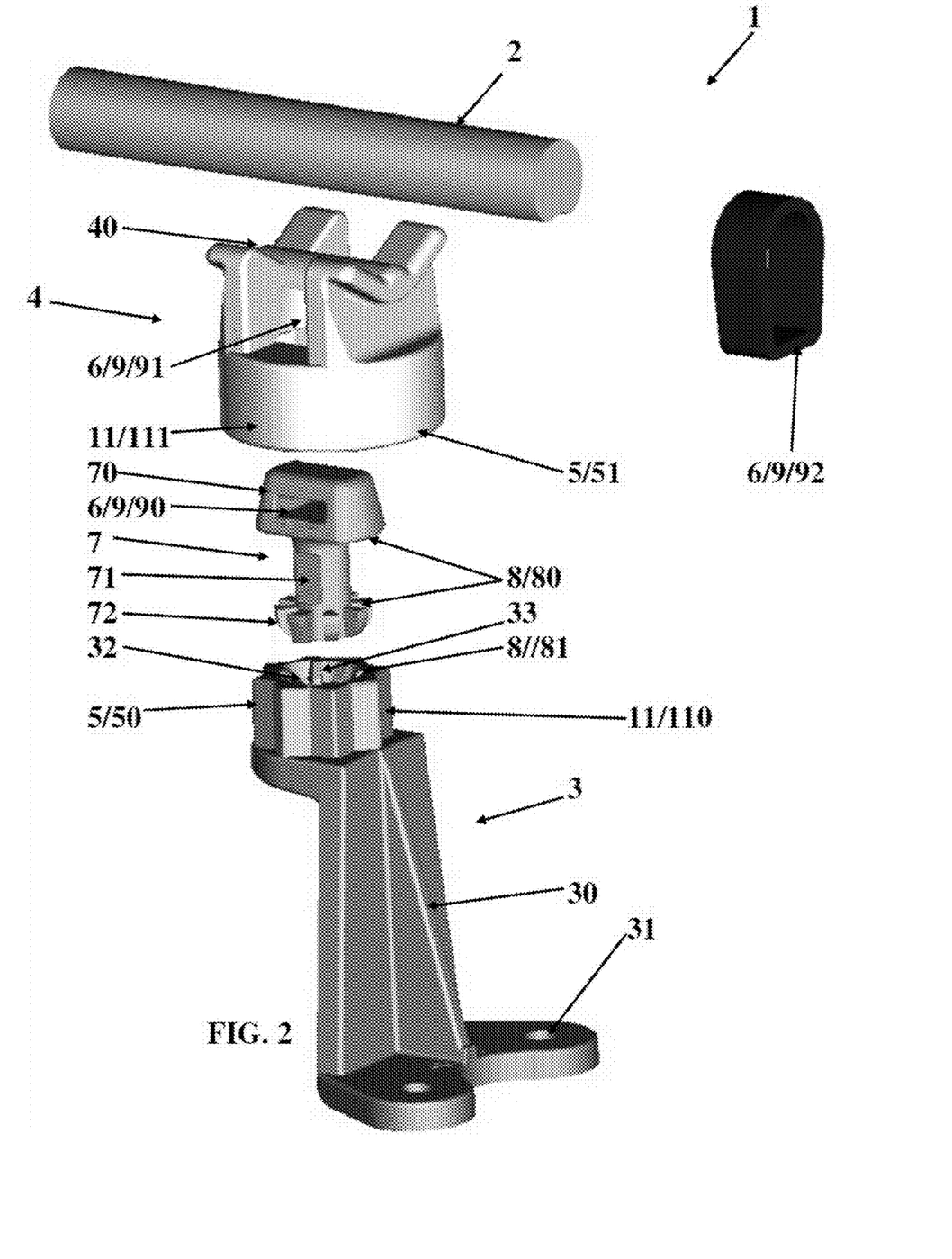
FIG. 2 is a schematic and exploded view of the fastening device according to the invention and illustrated in FIG. 1.

According to a first embodiment illustrated in FIGS. 1 to 3, such a base 3 comprises (more particularly is composed of) said foot 30, which is, firstly, intended to be made integral with the structure (more particularly by means of at least one fastening member that receives said at least one receiving means 31 that is comprised in this foot 30), which is, secondly, equipped with the block 7 (which has the features described above) and which, thirdly, comprises said at least one receiving means 31 (which has the features described above), said hole 32 (which has the features described above and which receives the block 7), a part of the mounting means 5 (more particularly the male interlocking means 50, notably, the outer ring), as well as a part of the fastening means 6 (more particularly a part of the securing means 8—in particular the complementary abutment means 81), or even a part of the angular positioning means 11 (more particularly the toothed ring).

In this first embodiment, the support 4 (which has the features described above) sits directly above said base 3 (more particularly the foot 30 of this base 3) and is mounted directly on this base 3 (more particularly on the foot 30 of this base 3) via the aforementioned mounting means 5.

In this first embodiment, the mounting means 5 have the features described above and comprise, firstly, the male interlocking means 50, which are comprised in the foot 30, and secondly, the female interlocking means 51, which are configured to cooperate with the male interlocking means 50 and which are comprised in the support 4.

In this first embodiment, the fastening means 6 have the features described above and comprise, firstly, the block 7 which thus equips the foot 30 (and which has the features described above), and secondly, the securing means 8 (which have the features described above), which are configured to secure said block 7 and the foot 30, and which comprise the abutment means 80 which are comprised in said block 7 and the complementary abutment means 81 which are comprised in the foot 30, and thirdly, the assembly means 9 (which have the features described above), which are configured to assemble said at least one object 2, said support 4, and said block 7.

According to a second embodiment, said base 3 comprises, firstly, said foot 30, which is intended to be secured to the structure, and which comprises said at least one receiving means 31.

Moreover, said base 3 comprises a spacer 35 which is interposed between the foot 30 and said at least one support 4. Said spacer 35 is equipped with said at least one block 7 (which has the features described above) and comprises a part of the mounting means 5 (which has the features described above, more particularly the male interlocking means 50, more particularly at least one outer ring as described above), as well as a part of the fastening means 6 (which has the features described above, more particularly a part of the securing means 8—notably the complementary abutment means 81), or even a part of the angular positioning means 11 (which has the features described above, more particularly at least one toothed ring as described above). Said spacer 35 also comprises said at least one hole 32, which has the features described above, and which receives said at least one block 7.

In this second embodiment, said at least one support 4 (which has the features described above) sits above or equips laterally said spacer 35 and is mounted on this spacer 35 by means of the mounting means 5 mentioned described. These mounting means 5 (which have the features described above) comprise, therefore, firstly, the male interlocking means 50 (which have the features described above) which are comprised in the spacer 35, and secondly, the female interlocking means 51 (which have the features described above), which are configured to cooperate with the male interlocking means 50, and which are comprised in said at least one support 4.

In this second embodiment, the fastening means 6 (which have the features described above) comprise, firstly, said at least one block 7 (which has the features described above) which thus equips the spacer 35, secondly, the securing means 8 (which have the features described above), which are configured to secure said at least one block 7 and the spacer 35, and which comprise the abutment means 80 that are comprised in said at least one block 7 and the complementary abutment means 81 that are comprised in the spacer 35, and thirdly, the assembly means 9 (which have the features described above), which are configured to assemble said at least one object 2, said at least one support 4 and said at least one block 7.

Furthermore, in this second embodiment, said base 3 comprises additional mounting means 36, which are configured to mount the spacer 35 on the foot 30, more particularly directly. Such additional mounting means 36 may have similar or even identical features to the mounting means 5 described above and may therefore comprise, firstly, additional male interlocking means 360 (which may have features similar, or even identical, to the male interlocking means 50 described above), which are comprised in the foot 30, and secondly, additional female interlocking means 361 (which may have features similar to, or even identical to, the female interlocking means 51 described above), which are configured to cooperate with the additional male interlocking means 360, and which are comprised in the spacer 35.

Furthermore, in this second embodiment, said base 3 comprises additional fastening means 37 which are configured to fasten the spacer 35 on the foot 30. These additional fastening means 37 may have similar or even identical features to the fastening means 6 described above and may thus comprise, firstly, an additional block 370 which equips the foot 30 (more particularly that receives a hole that is comprised in this foot 30), secondly, additional securing means 371 which are configured to secure said additional block 370 and the foot 30, and thirdly, additional assembly means 372 which are configured to assemble said spacer 35 and said additional block 370.

It will be observed that this additional block 370 may have similar or even identical features to said at least one block 7 described above.

With regard to the additional securing means 371, these may, like the securing means 8 described above, be configured to allow rotation of said additional block 370 in relation to the foot 30 and to at least limit the translational movement of said additional block 370 in relation to the base 30.

These additional securing means 371 may have similar or even identical features to the securing means 8 described above.

In particular, these additional securing means 371 may comprise, firstly, abutment means 371*a* (which may have similar or even identical features to the abutment means 80 described above) that are comprised in said additional block 370, and secondly, complementary abutment means 371*b* (which may have similar or even identical features to the complementary abutment means 81 described above), which cooperate with the abutment means 371*a*, and which are comprised in the foot 30.

With regard to the additional assembly means 372 and like the assembly means 9 described above, at least a part of these additional assembly means 372 may be configured to be removable as well as to be repositioned or replaced.

These additional assembly means 372 may have similar or even identical features to the assembly means 9 described above.

These additional assembly means 372 may therefore comprise, firstly, at least one through-hole 372*a* that is comprised in said additional block 370, secondly, at least one through-hole 372*b* that is comprised in said spacer 35, and thirdly, at least one complementary assembly member 372*c*, which passes through said at least one through-hole 372*a*, which is comprised in said additional block 370, as well as said at least one through-hole 372*b*, which is comprised in said spacer 35.

Like said at least one assembly member 92 described above, such a complementary assembly member, firstly, is removable and configured to be repositioned or replaced, and secondly, comprises at least one clamp, at least one tie, or at least one cotter.

In this second embodiment, the fastening device 1 may also comprise additional temporary holding means which are configured to temporarily hold said spacer 35 in position on said foot 30, more particularly on said additional block 370.

These additional temporary holding means may have similar or even identical features to the temporary holding means 10 described above.

In particular, these additional temporary holding means may comprise, firstly, at least one abutment means (more particularly in the form of at least one element in relief, in particular a knurl), which are comprised in said additional block 370 (more particularly the head of such an additional block 370), and secondly, at least one complementary abutment means (notably a flange) that is comprised in said spacer 35, and which cooperates with said at least one abutment means of said additional block 370.

In this second embodiment, said base 3 may also comprise additional angular positioning means 38, which are configured to angularly position the spacer 35 in relation to the foot 30, in a plurality of angular positions which may be selected.

These additional angular positioning means 38 may have similar or even identical features to the additional angular positioning means 11 described above.

In particular, such additional angular positioning means 38 may comprise, firstly, a toothed ring that is comprised in the foot 30 (more particularly that is comprised in the additional male interlocking means 360, in particular in the form of an outer ring), and secondly, a toothed sleeve that is comprised in said spacer 35 (more particularly that is comprised in the additional female interlocking means 361).

According to a first variant (not shown) of this second embodiment, the fastening device 1 comprises a single support 4 (which has the features described above), means 5 for mounting this single support 4 on said spacer 35 (these mounting means 5 having the features described above) as well as fastening means 6 of said at least one object 2 at least on this single support 4 (these fastening means 6 having the features described above). Said spacer 35 may therefore constitute an extension configured to raise said support 4.

As mentioned above, the invention relates to a device 1 for fastening at least one object 2 to a structure.

Figure 4:
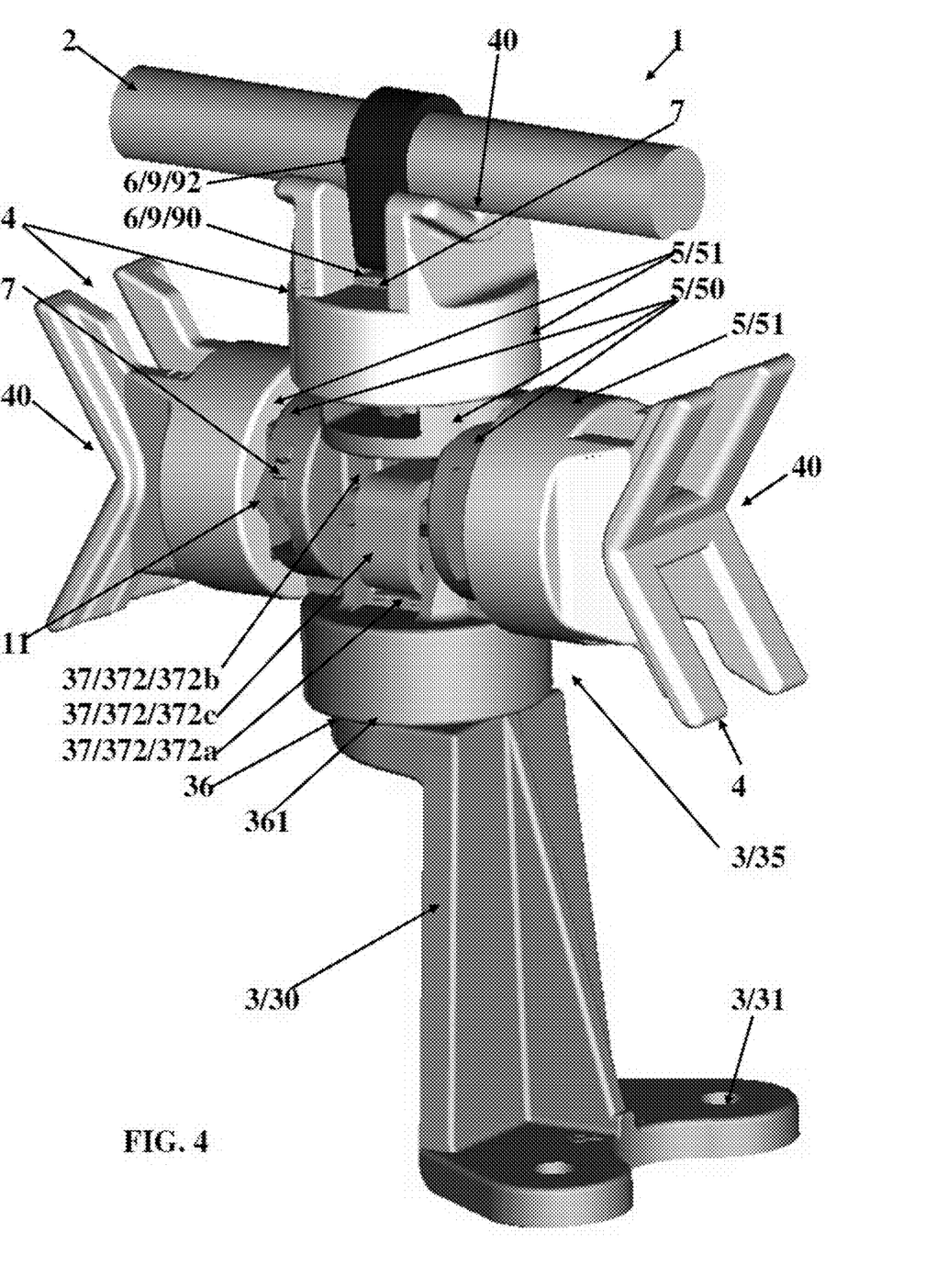
FIG. 4 is a schematic perspective view of a second embodiment of a fastening device according to the invention.
Figure 5:
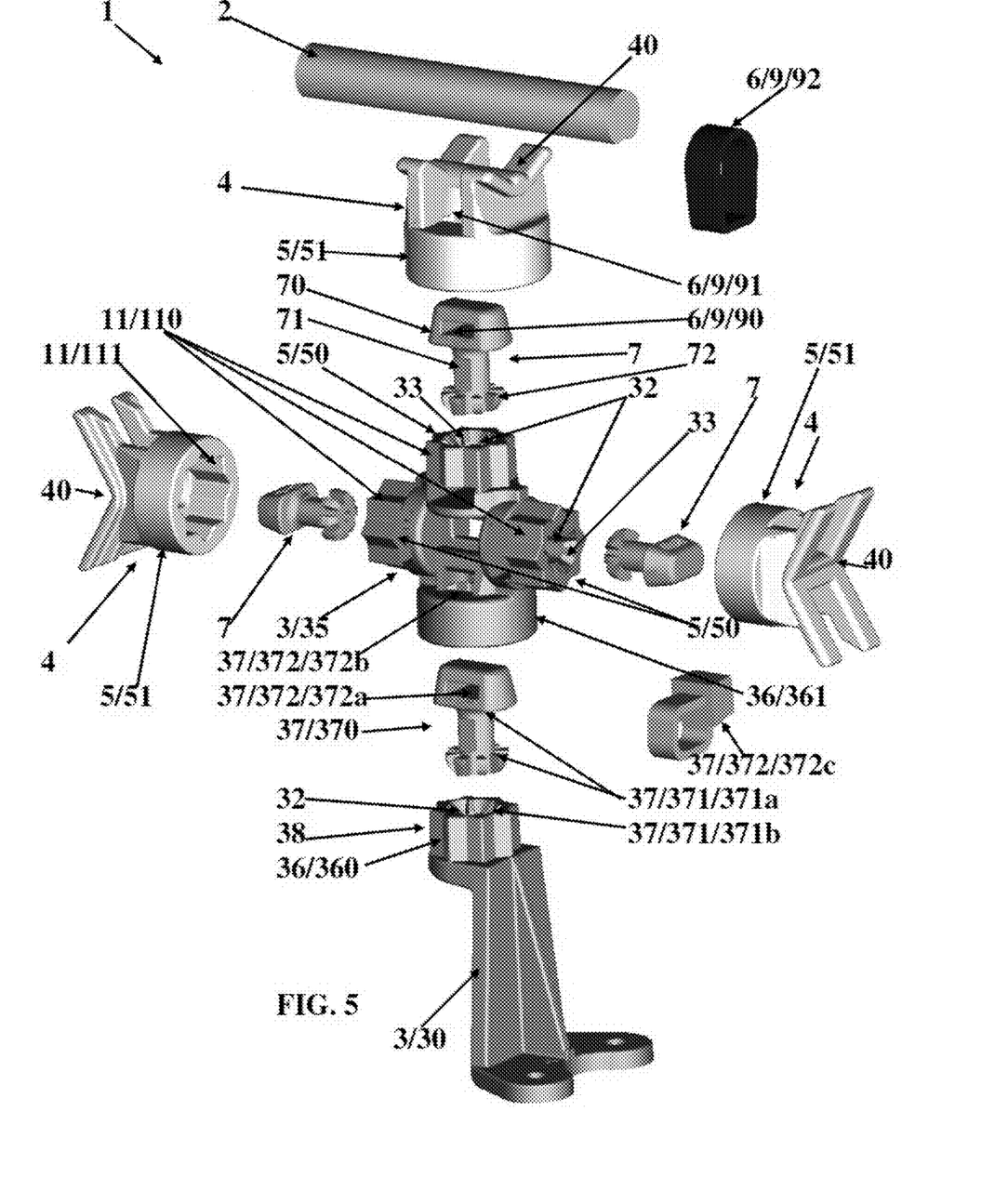
FIG. 5 is a schematic and exploded view of the fastening device according to the invention and illustrated in FIG. 4.

The invention therefore also relates to a device 1 for fastening a plurality of objects 2 to a structure. Such a fastening device 1 is illustrated in FIGS. 4 and 5.

In fact, this fastening device 1 has the features described above.

In particular, this fastening device 1 comprises a base 3 which is intended to be fastened to said structure. This base 3 is, more particularly, according to the second embodiment described above and may constitute a second variant of this second embodiment. This base 3 therefore comprises the foot 30 as well as the spacer 35 described above. This base 3 also comprises the additional fastening means 37 described above.

This fastening device 1 also comprises a plurality of supports 4 which have the features described above. In particular, these supports 4 each comprise receiving means 40, which are configured to receive at least one of said objects 2, and which have the features described above.

This fastening device 1 also comprises mounting means 5 which are configured to mount said supports 4 on the base 3, more particularly on the spacer 35. Here again, these mounting means 5 have the features described above. In particular, these mounting means 5 comprise, firstly, male interlocking means 50 (which have the features described above) comprised in the base 3 (more particularly, comprised in the spacer 35 of this base 3), and secondly, female interlocking means 51 (which have the features described above), which are configured to cooperate with the male interlocking means 50, and which are comprised in each of said supports 4.

The fastening device 1 further comprises fastening means 6 which are configured to fasten said objects 2 at least on said supports 4, notably which are configured to fasten at least one of said objects 2 to at least one of said supports 4. These fastening means 6 have the features described above.

In particular, these fastening means 6 comprise, firstly, a plurality of blocks 7, which equip the base 3 (more particularly, which equip the spacer 35 of this base 3), and which have the features described above. In fact, this base 3 (more particularly the spacer 35 of this base 3) comprises a plurality of holes 32, which have the features described above, and which each receive one of said blocks 7.

In particular, such a block 7 comprises, firstly, a head 70 which is located at least partly (or even entirely) outside the base 3 (more particularly outside the spacer 35 and/or one of the said holes 32 of the base 3), and secondly, a shaft 71 which extends from the head 70, along an axis (in particular coinciding with the axis along which one of said holes 32 in the base 3, and more particularly the spacer 35, extends) and at least partly (or even entirely) inside the base 3 (more particularly inside the spacer 35 and/or one of said holes 32 in this base 3, more particularly of this spacer 35), and thirdly, a plurality of lateral feet 72 which extend laterally from the shaft 71, more particularly divergently and/or radially in relation to said axis (along which the shaft 71 extends), notably inside the base 3 (more particularly inside the spacer 35 and/or one of said holes 32 of this base 3, more particularly of this spacer 35).

This head 70, this shaft 71 and these lateral feet 72 have the features described above.

These fastening means 6 further comprise securing means 8 which are configured to secure said blocks 7 and the base 3, more particularly said blocks 7 and the spacer 35 of this base 3. These securing means 8 have the features described above and comprise, firstly, abutment means 80 (which have the features described above), which are comprised in said blocks 7, and secondly, complementary abutment means 81 (which have the features described above), which cooperate with the abutment means 80 and which are comprised in the base 3 (more particularly that are comprised in the spacer 35 of this base 3).

These fastening means 6 also comprise assembly means 9, which have the features described above, and which are configured to assemble said objects 2, said supports 4, and said blocks 7.

In particular, these assembly means 9 may comprise, firstly, at least one through-hole 90, which is comprised in each of said blocks 7, secondly, at least one through-hole 91, which is comprised in each of said supports 4, and thirdly, a plurality of assembly members 92 (which have the features described above), each of which passes through said at least one through-hole 90, which is comprised in one of said blocks 7, as well as said at least one through-hole 91, which is comprised in one of said supports 4, and which surrounds said at least one object 2.

According to another feature, this fastening device 1 may also comprise temporary holding means 10 which are configured to temporarily hold said supports 4 in position on said blocks 7.

Additionally, this fastening device 1 may also comprise additional temporary holding means, which are configured to temporarily hold said spacer 35 in position on said foot 30, more particularly on said additional block 370.

Such temporary holding means 10 and such additional temporary holding means have the features described above.

Another feature of the fastening device 1 relates to the fact that it also comprises angular positioning means 11 which are configured to position said supports 4 angularly in relation to the base 3 (more particularly in relation to the spacer 35) in a plurality of angular positions which may be selected.

Yet another feature relates to the fact that said base 3 may further comprise additional angular positioning means 38 which are configured to angularly position the spacer 35 relative to the foot 30 in a plurality of angular positions which may be selected.

Such angular positioning means 11 and such additional angular positioning means 38 have the features described above.

The invention claimed is:

1. A fastening device for fastening at least one object on a structure, the fastening device comprising:
   a base intended to be fastened on the structure;
   at least one block secured to the base, wherein the at least one block comprises at least one through-hole; and
   at least one support configured to receive the at least one object, wherein the at least one support is mounted on the base and comprises at least one other through-hole:
   wherein the fastening device comprises assembly means configured for assembly of the at least one object, the at least one support and the at least one block,
   wherein the assembly means comprise:
   the at least one through-hole, which is comprised on the at least one block,
   the at least one other through-hole, which is comprised in the at least one support, and
   at least one assembly member, which passes through the at least one through-hole in the at least one block, as well as through the at least one other through-hole in the at least one support, and which surrounds the at least one object,
   so as to assemble the at least one object, the at least one support and the at least one block.

2. The fastening device according to claim 1, wherein the at least one block comprises:
   a head, which is situated at least partly outside the base,
   a shaft, which extends from the head along an axis and at least partly inside the base, and
   a plurality of lateral feet which extend laterally from the shaft.

3. The fastening device according to claim 1, wherein the at least one block is secured to the base in a manner allowing rotation of the at least one block in relation to the base and to at least limit the translational movement of the at least one block in relation to the base.

4. The fastening device according to claim 1, wherein the at least one block is secured to the base by
   abutment means which are comprised in the at least one block, and
   complementary abutment means comprised in the base,
   wherein the abutment means comprised in the at least one block cooperate with the complementary abutment means comprised in the base.

5. The fastening device according to claim 1, wherein the assembly member is configured to be removable as well as to be repositioned or replaced.

6. The fastening device according to claim 5, wherein the assembly member comprises at least one clamp, at least one tie, or at least one cotter.

7. The fastening device according to claim 1, further comprising temporary holding means which are configured to temporarily hold the at least one support in position on the at least one block.

8. The fastening device according to claim 7, wherein the temporary holding means comprise
   at least one abutment means, which is comprised in the at least one block, and
   at least one complementary abutment means, which is comprised in the at least one support, and which cooperates with the at least one abutment means of the at least one block.

9. The fastening device according to claim 1, wherein the support is mounted to the base by
   male interlocking means comprised in the base, and
   female interlocking means comprised in the at least one support,
   wherein the female interlocking means comprised in the at least one support are configured to cooperate with the male interlocking means comprised in the base.

10. The fastening device according to claim 1, wherein the fastening device comprises angular positioning means which are configured to angularly position the at least one support in relation to the base in a plurality of angular positions.

11. The fastening device according to claim 1, wherein the base comprises a foot configured to be made integral with the structure, wherein the block is mounted on the foot.

12. The fastening device according to claim 1, wherein the base comprises:
    a foot configured to be made integral with the structure, and
    a spacer, which is mounted on and fastened to the foot and interposed between the foot and the at least one support,
    wherein the at least one block is mounted on and fastened to the spacer.

13. The fastening device according to claim 12, wherein the fastening device comprises:
    an additional block, the additional block being mounted on and secured to the foot, and
    additional assembly means which are configured to assemble the spacer and the additional block.

14. The fastening device according to claim 12, wherein the base further comprises additional angular positioning means, which are configured to position the spacer angularly in relation to the foot in a plurality of angular positions.

15. The fastening device according to claim 1, wherein the fastening device is adapted for fastening a plurality of objects on the structure, wherein:
    the fastening device comprises a plurality of supports, each of the supports being configured to receive at least one of the objects;
    each of the supports is mounted on the base;
    the fastening means comprise a plurality of blocks mounted on and secured to the base, and a plurality of assembly means, each of the assembly means being configured to assemble at least one of the objects, at least one of the supports, and at least one of the blocks,
    wherein each of the respective blocks comprises at least one respective through-hole,
    wherein each of the respective supports comprises at least one respective other through-hole, wherein each of the respective assembly means comprise:
- the at least one respective through-hole, which is comprised on the at least one respective block,
- the at least one respective other through-hole, which is comprised in the at least one respective support, and
- at least one respective assembly member, which passes through the at least one respective through-hole in the at least one respective block, as well as through the at least one respective other through-hole in the at least one respective support, and which surrounds the at least one respective object,
- so as to assemble the at least one respective object, the at least one respective support, and the at least one respective block.

16. The fastening device according to claim 2, wherein the lateral feet extend laterally from the shaft divergently and/or radially in relation to the axis.

17. The fastening device according to claim 10, wherein the at least one support comprises part of the angular positioning means.

18. The fastening device according to claim 11, wherein the fastening device comprises angular positioning means which are configured to angularly position the at least one support in relation to the base in a plurality of angular positions, and wherein the foot comprises part of the angular positioning means.

* * * * *